US012076845B2

(12) United States Patent
Castanos et al.

(10) Patent No.: US 12,076,845 B2
(45) Date of Patent: Sep. 3, 2024

(54) POWER TOOL INCLUDING SOFT-STOP TRANSMISSION

(71) Applicant: MILWAUKEE ELECTRIC TOOL CORPORATION, Brookfield, WI (US)

(72) Inventors: Carmen J. Castanos, Milwaukee, WI (US); Terry L Timmons, Oconomowoc, WI (US); Jarrod P. Kotes, Grafton, WI (US); Benjamin J. Boldt, Milwaukee, WI (US); Helton F. Vandenbush, Belgium, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/180,175

(22) Filed: Mar. 8, 2023

(65) Prior Publication Data

US 2023/0286127 A1 Sep. 14, 2023

Related U.S. Application Data

(60) Provisional application No. 63/319,533, filed on Mar. 14, 2022.

(51) Int. Cl.
*B25F 5/00* (2006.01)
*B24B 23/02* (2006.01)

(52) U.S. Cl.
CPC ............ *B25F 5/001* (2013.01); *B24B 23/028* (2013.01)

(58) Field of Classification Search
CPC .. F16D 63/002; F16D 63/006; F16D 2121/20; B60T 1/062; B60T 1/005; B24B 23/028; B24B 23/02; B24B 23/022
See application file for complete search history.

(56) References Cited

U.S. PATENT DOCUMENTS 5,679,066 A * 10/1997 Butz ........................ B24B 23/03 451/344
5,692,410 A * 12/1997 Fenelon .................. B29C 70/84 74/411
8,534,378 B2 9/2013 Wiker
(Continued)

FOREIGN PATENT DOCUMENTS

CN 208913856 U 5/2019
DE 102013200865 A1 * 7/2014 ............. B24B 23/02
(Continued)

*Primary Examiner* — Nathaniel C Chukwurah
(74) *Attorney, Agent, or Firm* — Michael Best & Friedrich LLP

(57) ABSTRACT

A power tool includes a soft-stop transmission having a first component and a second component. The first component is configured to receive torque from a motor to rotate the first component in a first rotational direction. The second component is connected to an output of the power tool and is configured to rotate in a first rotational direction in unison with the first component. The second component is configured to rotate in the first rotational direction relative to the first component in response to angular deceleration of the first component. A damping element is positioned between the first component and second component, and the damping element is configured to bias the first component in the first rotational direction and the second component in an opposite, second rotational direction.

21 Claims, 5 Drawing Sheets

(56) References Cited

U.S. PATENT DOCUMENTS

| | | | | |
|---|---|---|---|---|
| 8,936,107 | B2 | 1/2015 | Numata | |
| 9,073,196 | B2 | 7/2015 | Numata | |
| 9,079,290 | B2 * | 7/2015 | Esenwein | B27B 5/32 |
| 10,105,816 | B2 | 10/2018 | Kim et al. | |
| 2008/0003929 | A1 | 1/2008 | Degen | |
| 2013/0209017 | A1 * | 8/2013 | Schadow | B24B 41/007 267/141 |
| 2014/0097058 | A1 * | 4/2014 | Yang | F16D 43/215 192/55.2 |
| 2020/0189066 | A1 | 6/2020 | Qu et al. | |
| 2021/0078132 | A1 | 3/2021 | Takeuchi | |

FOREIGN PATENT DOCUMENTS

| | | | |
|---|---|---|---|
| EP | 2394796 | B1 | 3/2016 |
| WO | 2020143376 | A1 | 7/2020 |

* cited by examiner

POWER TOOL INCLUDING SOFT-STOP TRANSMISSION

CROSS REFERENCE TO RELATED APPLICATIONS

This application claims priority to U.S. Provisional Patent Application No. 63/319,533, filed on Mar. 14, 2022, the entire content of which is incorporated herein by reference.

FIELD OF THE INVENTION

The present invention relates to power tools, and more particularly to power tools with braking systems.

BACKGROUND OF THE INVENTION

A power tool may include a braking system for the motor, drivetrain, transmission, or spindle. During braking, torque may be transmitted through the motor, drivetrain, transmission, or spindle to slow the rotation of a tool bit, saw blade, grinding disc, or other accessory coupled to the power tool having an inertial mass.

SUMMARY OF THE INVENTION

The present invention provides, in one aspect, a soft-stop transmission for use in a power tool. The soft-stop transmission includes a first component configured to receive torque from a motor of the power tool to rotate the first component in a first rotational direction. The soft-stop transmission also includes a second component connectable to an output of the power tool. The second component is configured to rotate in the first rotational direction in unison with the first component. The second component is also configured to rotate in the first rotational direction relative to the first component in response to angular deceleration of the first component. The soft-stop transmission further includes a damping element positioned between the first component and second component. The damping element is configured to bias the first component in the first rotational direction and the second component in an opposite, second rotational direction.

The present invention provides, in another aspect, a power tool including a motor, a ring gear configured to receive torque from the motor and having a radially extending finger with a first side and an opposite, second side, and a flywheel having a radially extending ear with a first side and an opposite, second side. The flywheel is configured to rotate in a first rotational direction in unison with the ring gear in response to torque received from the ring gear via engagement between the second side of the finger and the first side of the ear. The flywheel is also configured to rotate in the first rotational direction relative to the ring gear in response to angular deceleration of the ring gear and disengagement of the second side of the finger from the first side of the ear. The power tool also includes a damping element positioned between the ring gear and the flywheel. The damping element is configured to bias the second side of the finger into engagement with the first side of the ear.

The present invention provides, in another aspect, a power tool including a motor, a pulley configured to receive torque from the motor and having an arcuate pocket with a first interior surface and an opposite, second interior surface, and a hub having a lateral finger with a first side and an opposite, second side. The hub is configured to rotate in a first rotational direction in unison with the pulley in response to torque received from the pulley via engagement between the second interior surface of the arcuate pocket and the first side of the finger. The hub is also configured to rotate in the first rotational direction relative to the pulley in response to angular deceleration of the pulley and disengagement of the second interior surface of the arcuate pocket from the first side of the finger. The power tool also includes a damping element positioned between the pulley and the hub. The damping element is configured to bias the second interior surface of the arcuate pocket into engagement with the first side of the finger.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
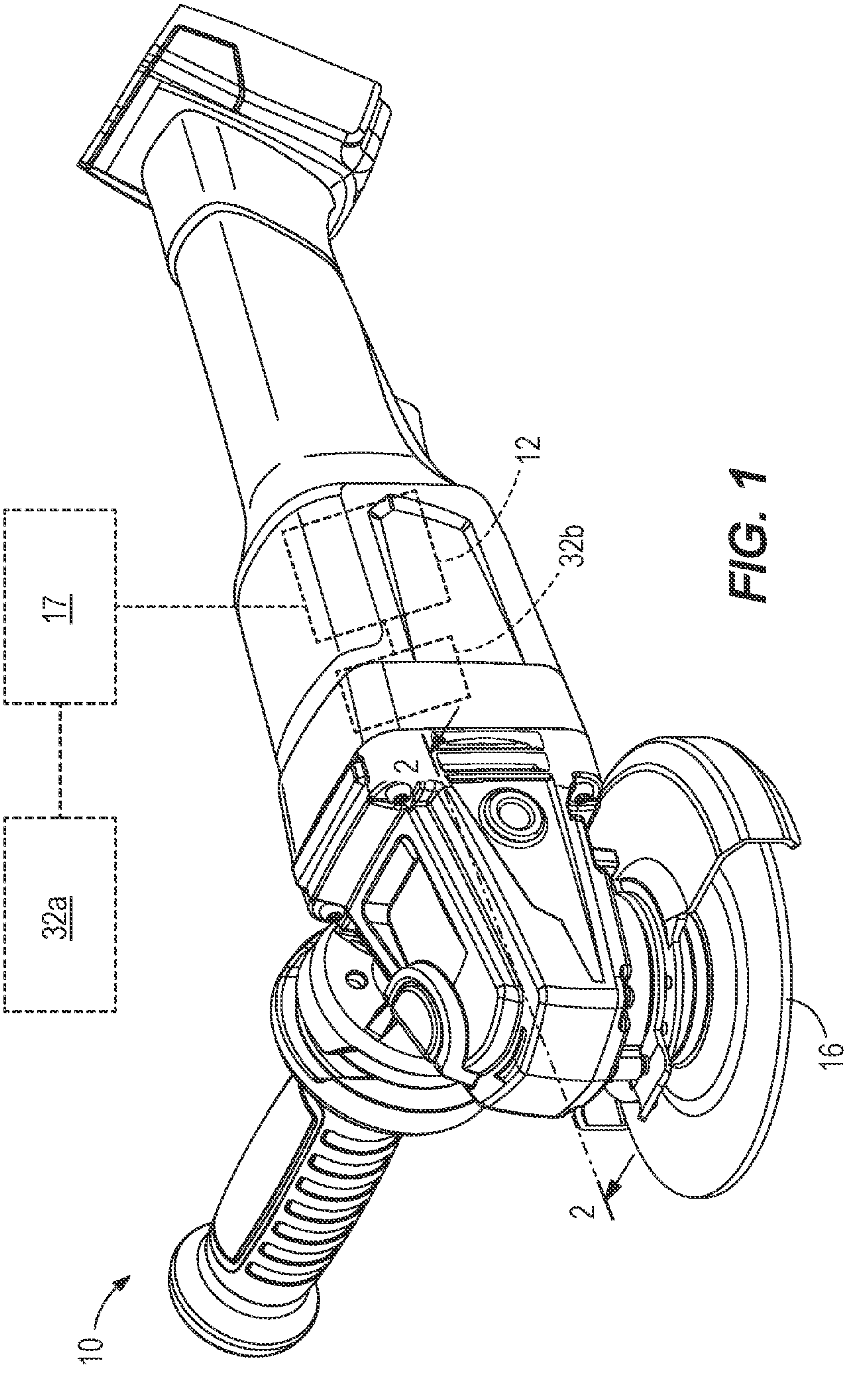
FIG. 1 is a perspective view of an angle grinder according to an embodiment of the present invention.
Figure 2:
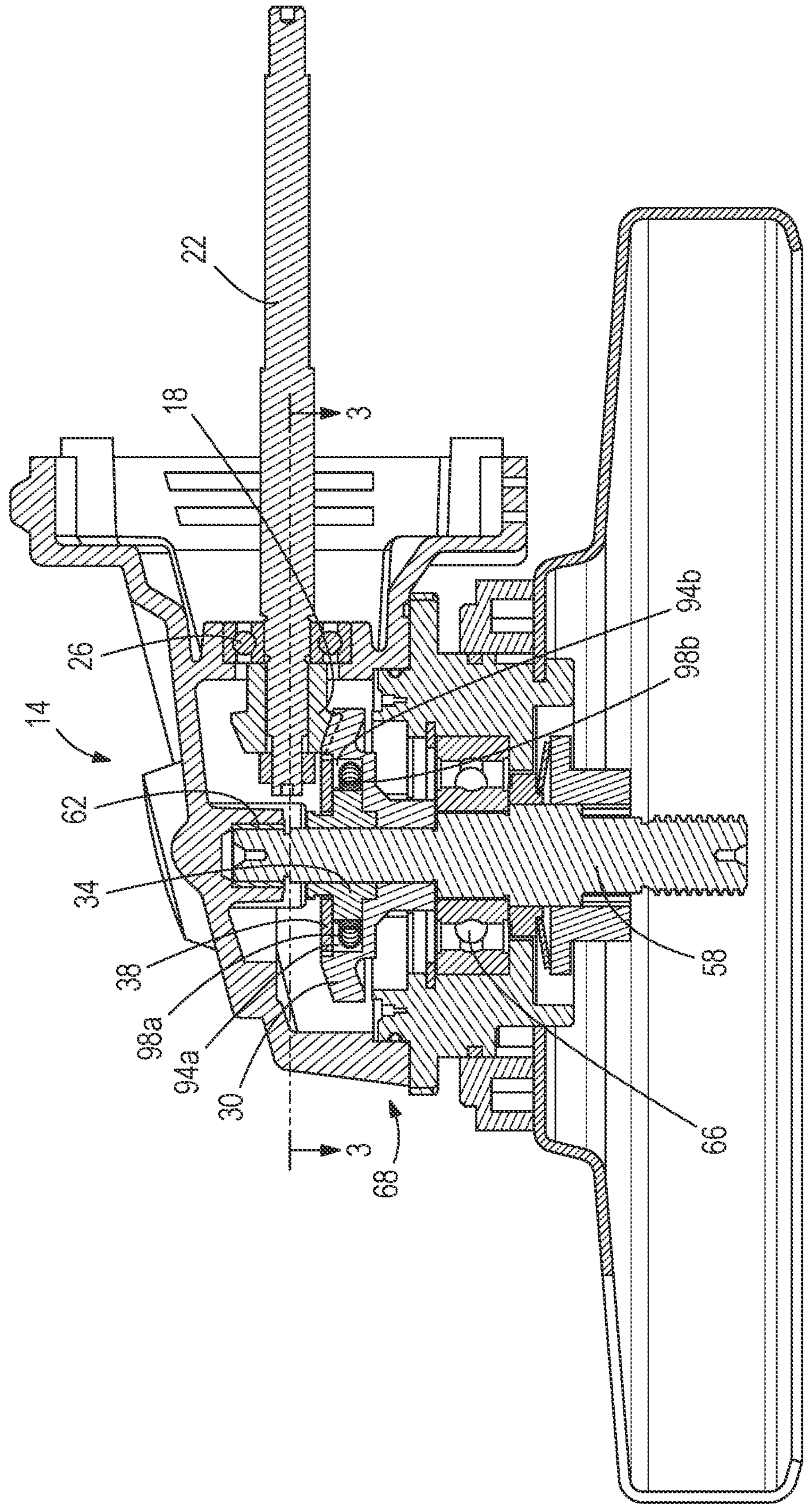
FIG. 2 is a cross-sectional view of a portion of the angle grinder of FIG. 1 through section 2-2 in FIG. 1.

With reference to FIGS. 1 and 2, a power tool in the form of an angle grinder 10 includes an electric motor 12, a drivetrain 14 that receives torque from the motor 12, and a rotating tool element or accessory (e.g., a grinding disc 16) affixed to an output of the drivetrain 14. The angle grinder 10 also includes an electronic controller 17 that, in response to user inputs to the angle grinder 10 (e.g., depressing a trigger), activates and deactivates the motor 12.

With further reference to FIG. 2, the drivetrain 14 includes a pinion gear 18 driven by a connected input shaft 22, which directly or indirectly receives torque from the motor 12, causing the pinion gear 18 to rotate. The pinion gear 18 is meshed with a beveled ring gear 30, such that rotation of the pinion gear 18 results in the rotation of the ring gear 30.

With further reference to FIGS. 1 and 2, in some embodiments, the angle grinder 10 includes a braking system configured to slow the rotation of the pinion gear 18 by braking the ring gear 30, the pinion gear 18, the motor 12, or any component of the drivetrain 14 disposed therebetween. In a first embodiment, the braking system could be configured as an electronic braking system 32*a*, in which the controller 17 momentarily reverses direction of the motor 12 to angularly decelerate and stop the motor 12 along with any downstream permanently driven components of the drivetrain 14. Alternatively, in another embodiment, the braking system 32*b* could include a mechanical actuator (e.g., a brake pad) that is selectively frictionally engageable with a brake drum or disk within the grinder 10 to angularly decelerate the motor 12 or any component of the drivetrain 14.

Figure 3B:
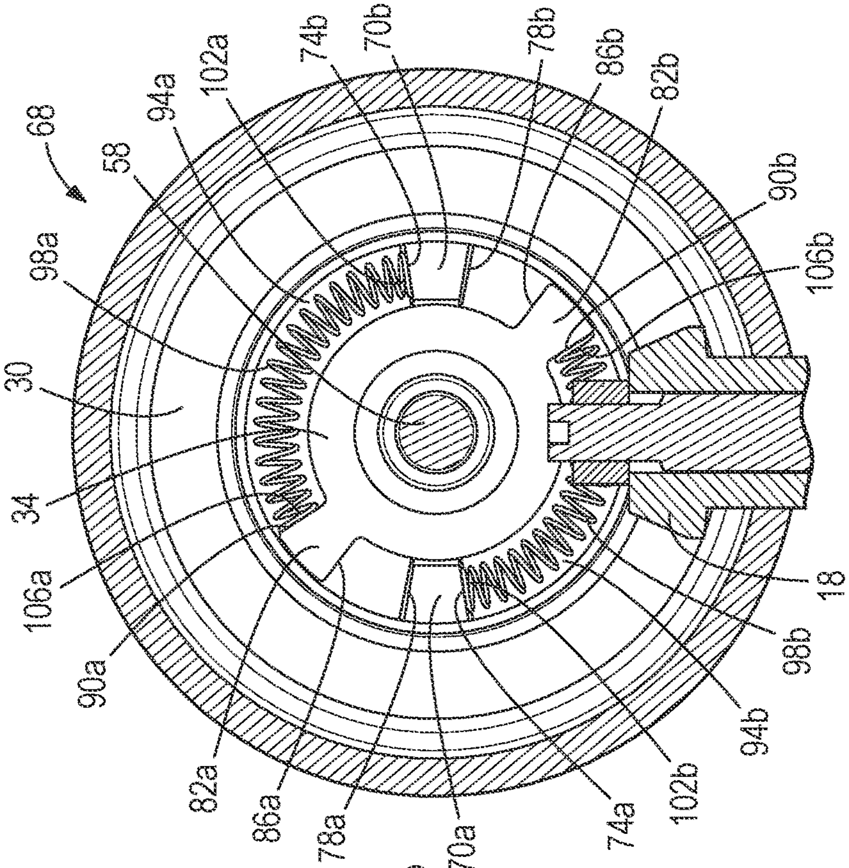
FIG. 3B is a cross-sectional view of the portion of the angle grinder of FIG. 2 through section 3-3 in FIG. 2, illustrating the soft-stop transmission in an overrun state.

With reference to FIGS. 2-3B, the ring gear 30 acts as a rotatable first torque transmission member that rotates with a first angular velocity. In other words, the ring gear 30 is a gear that is configured to receive rotational torque from the motor 12. The ring gear 30, in turn, engages with a flywheel 34 such that the ring gear 30 may transmit rotational torque to the flywheel 34. The flywheel 34 acts as a rotatable second torque transmission member that rotates with a second angular velocity. The flywheel 34 is fixedly coupled to an output spindle 58 for co-rotation with the output spindle 58 and is configured to be able to rotate relative to the ring gear 30 for at least a fraction of one rotation. The output spindle 58 is supported by an upper output spindle bearing 62 and a lower output spindle bearing 66. The flywheel 34 may be coupled to the output spindle 58 in any number of appropriate ways, including by being press-fit onto the output spindle 58, by means of a key and keyway system, or by being integrated into the output spindle 58 as a single monolithic piece. An accessory (e.g., a grinding disc) may be secured to, and operatively driven by, the output spindle 58. When the braking system is engaged as described above, the accessory is slowed in addition to the motor 12 because the accessory is coupled to the motor 12 via the output spindle 58 and the drivetrain 14.

Figure 3A:
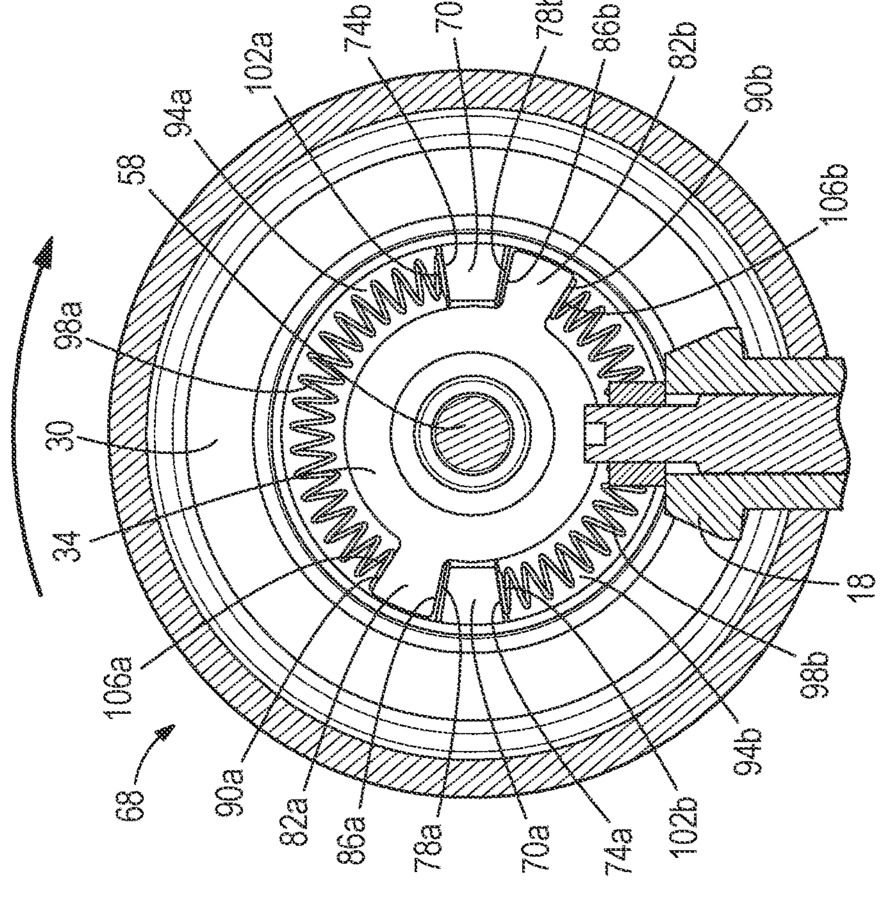
FIG. 3A is a cross-sectional view of the portion of the angle grinder of FIG. 2 through section 3-3 in FIG. 2, illustrating a soft-stop transmission in a driven state.

With reference to FIGS. 3A and 3B, the drivetrain 14 includes a soft-stop transmission 68, of which the ring gear 30 is a component. The ring gear 30 includes one or more inwardly protruding fingers 70*a*, 70*b*. In the illustrated embodiment, the ring gear 30) includes two fingers 70*a*, 70*b*, each of which includes a first side 74*a*, 74*b* and an opposite second side 78*a*, 78*b*. In an embodiment of the angle grinder 10 in which the ring gear 30 is rotated in a clockwise direction from the frame of reference of FIGS. 3A and 3B, the second sides 78*a*, 78*b* of the fingers 70*a*, 70*b* are configured to act as torque-transmitting surfaces.

The drivetrain 14 also includes a flywheel 34 rotatably affixed to an output spindle 58 of the angle grinder 10 to which the grinding disc is mounted. The flywheel includes one or more outwardly protruding ears 82*a*, 82*b*. The flywheel 34 may include the same number of ears 82*a*, 82*b* as the number of fingers 70*a*, 70*b* on the ring gear 30. Each of the ears 82*a*, 82*b* includes a first side 86*a*, 86*b* and an opposite, second side 90*a*, 90*b*. In an embodiment of the angle grinder 10 in which the ring gear 30 is rotated in a clockwise direction from the frame of reference of FIGS. 3A and 3B, the first sides 86*a*, 86*b* of the ears 82*a*, 82*b* are configured to act as torque-receiving surfaces. The fingers 70*a*, 70*b* and the ears 82*a*. 82*b* are configured such that, when the ring gear 30 is rotated in a clockwise direction, the fingers 70*a*, 70*b* abut and thereby engage the ears 82*a*, 82*b*. Specifically, the second sides 78*a*, 78*b* of the fingers 70*a*, 70*b* rotationally engage the first sides 86*a*, 86*b* of the ears 82*a*, 82*b*, respectively, thereby transmitting torque from the fingers 70*a*, 70*b* to the ears 82*a*, 82*b* in a rotational direction as shown by the arrow in FIG. 3A. The (clockwise) rotational direction of the ring gear 30 and the flywheel 34 may also be called a torque-transmitting direction.

With further reference to FIGS. 3A and 3B, dual cavities 94*a*, 94*b* are defined between non-mated pairs of fingers 70*a*, 70*b* and ears 82*a*, 82*b*. Specifically, a first cavity 94*a* is defined between the ear 82*a* and finger 70*b*, whereas a second cavity 94*b* is defined between the ear 82*b* and the finger 70*a*. The cavities 94*a*, 94*b* have variable sizes depending on the state in which the soft-stop transmission 68 is operating. As will be described in further detail below, when the soft-stop transmission 68 is operating in a driven state in which the mated pairs of fingers and ears (70*a*, 82*a* and 70*b*, 82*b*) are engaged, torque is transmitted from the ring gear 30 to the flywheel 34, causing the output spindle 58 to rotate, and the arc length of the cavities 94*a*, 94*b* is maintained at a constant value. However, when the soft-stop transmission 68 is operating in an overrun state, the flywheel 34 overruns (i.e., rotates relative to) the ring gear 30, causing the fingers 70*a*, 70*b* and ears 82*a*, 82*b* to disengage and the arc length of the cavities 94*a*, 94*b* to be reduced.

With further reference to FIGS. 3A and 3B, the soft-stop transmission 68 also includes damping elements 98*a*, 98*b* disposed in the respective cavities 94*a*, 94*b*. In some embodiments, the damping elements 98*a*, 98*b* are configured as mechanical springs, dampers, or combined spring-dampers. Each damping element 98*a*, 98*b* includes a first end 102*a*, 102*b* and an opposite, second end 106*a*, 106*b*. For example, the first end 102*a* of the damping element 98*a* contacts the first side 74*b* of the finger 70*b*, and the second end 106*a* contacts the second side 90*a* of the ear 82*a*. And, the first end 102*b* of the damping element 98*b* contacts the first side 74*a* of the finger 70*a*, and the second end 106*b* contacts the second side 90*b* of the ear 82*b*. At any point in time, the degree of compression of the damping elements 98*a*, 98*b* depends upon the arc lengths of the cavities 94*a*, 94*b*. Therefore, the amount of compression of the damping elements 98*a*, 98*b* depends upon the amount of relative rotation between the flywheel 34 and the ring gear 30. The damping elements 98*a*, 98*b* bias the second sides 78*a*, 78*b* of the fingers 70*a*, 70*b* into contact with the first sides 86*a*, 86*b* of the ears 82*a*, 82*b*. When the soft-stop transmission 68 transitions from the driven state to the overrun state, the second sides 78*a*, 78*b* of the fingers 70*a*, 70*b* disengage the first sides 86*a*, 86*b* of the ears 82*a*, 82*b*, reducing the arc lengths of the cavities 94*a*, 94*b* and thus compressing the damping elements 98*a*, 98*b*. As shown in FIG. 3A, the damping elements 98*a*, 98*b* are configured to bias the ring gear 30 in a clockwise rotational direction and the flywheel 34 in an opposite, counter-clockwise rotational direction. As a result, the damping elements 98*a*, 98*b*, when in their rebounded state, also maintain the soft-stop transmission 68 in the driven state with the fingers 70*a*, 70*b* engaged with the ears 82*a*, 82*b*.

In operation of the angle grinder 10, and with further reference to FIG. 3B, the rotation of the motor 12 may be slowed at various times. For example, the braking system of the angle grinder 10 may be engaged, thereby causing the pinion gear 18, the motor 12, or any component of the drivetrain 14 therebetween, including the ring gear 30, to decelerate. Sudden deceleration, and thus reduction in the angular velocity, of the ring gear 30 causes the flywheel 34 (due to its rotational inertia) to momentarily continue rotating in the same direction (i.e., clockwise from the frame of reference of FIG. 3B). In other words, during braking of the ring gear 30, the angular velocity of the flywheel 34 may not be reduced as quickly as the angular velocity of the ring gear 30. As the ring gear 30 decelerates, the fingers 70*a*, 70*b* may lose contact with the ears 82*a*, 82*b* because of the difference in angular velocities between the flywheel 34 and the ring gear 30, reducing the arc lengths of the cavities 94*a*, 94*b* as described above and compressing the respective damping elements 98. The compression of the damping elements 98*a*, 98*b* permits a "soft stop" of the flywheel 34 and reduces the torque impulse that would otherwise be experienced by the output spindle 58 and the attached grinding disc in the absence of the damping elements 98*a*, 98*b* (and with the output spindle 58 rotatably affixed to the ring gear 30). During compression, the damping elements 98*a*, 98*b* apply a moment to the flywheel 34 in a counter-rotational direction (i.e., in a counter-clockwise direction from the frame of reference of FIG. 3B) to reduce the difference in angular velocities of the flywheel 34 and the ring gear 30, eventually bringing the flywheel 34 and the attached output spindle 58 to a stop.

Figure 4:
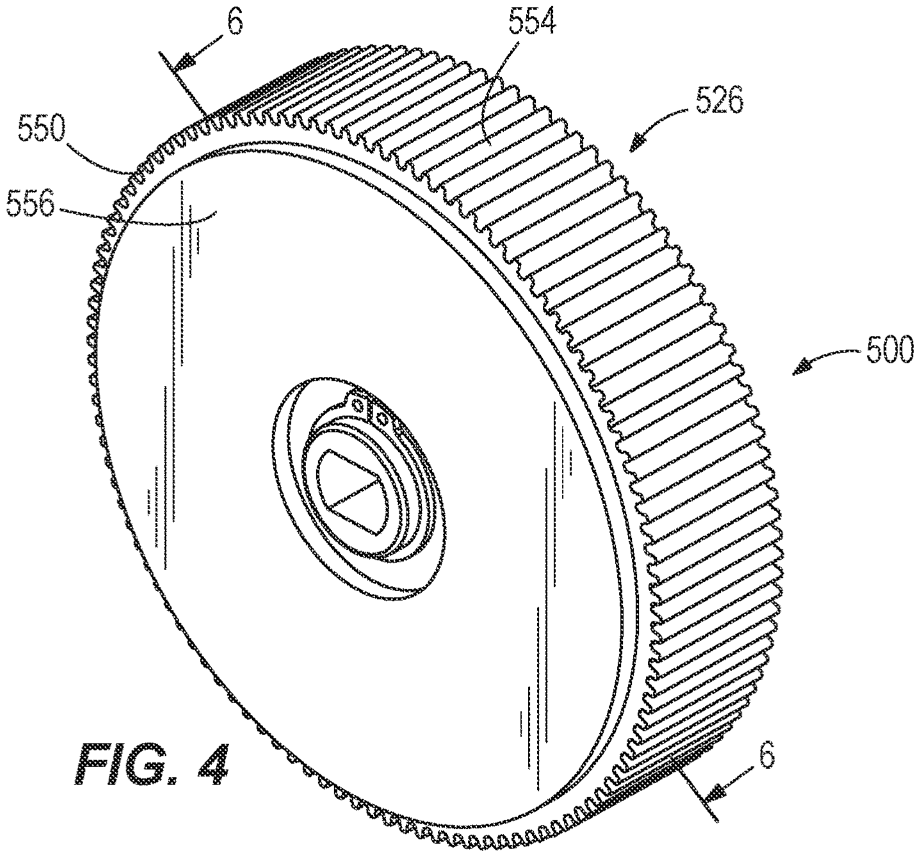
FIG. 4 is a front perspective view of a soft-stop transmission, according to an embodiment of the invention, for use with the power tool of FIG. 1.
Figure 5:
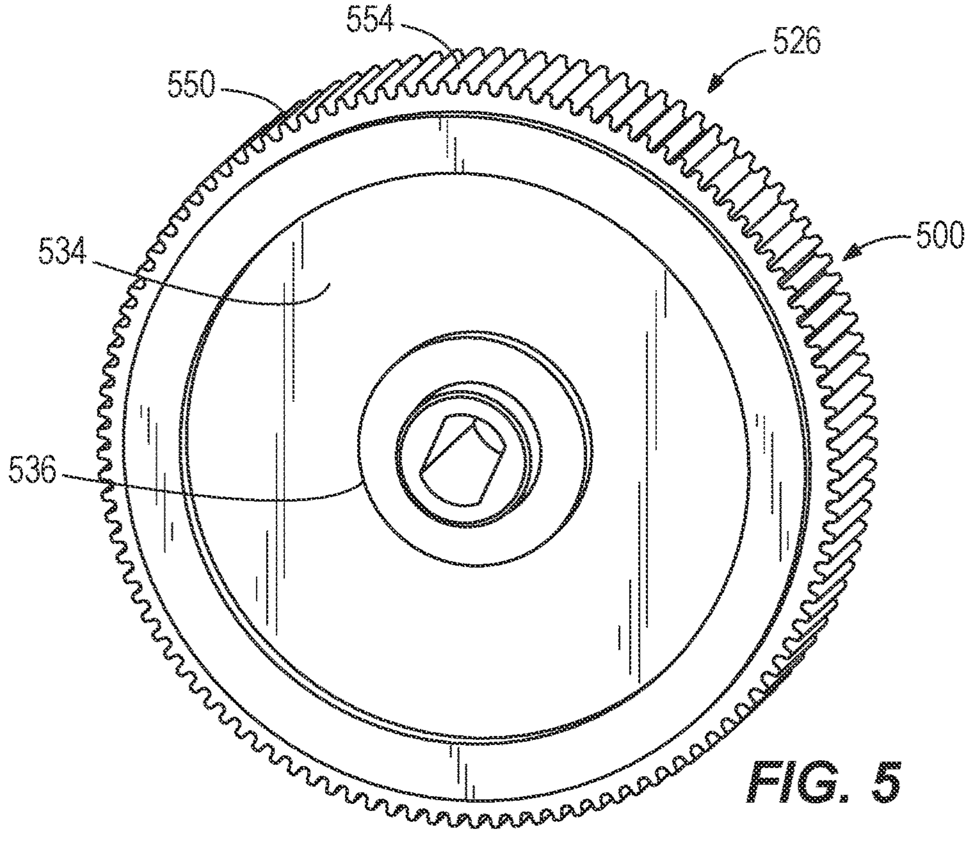
FIG. 5 is a rear perspective view of the soft-stop transmission of FIG. 4.
Figure 6:
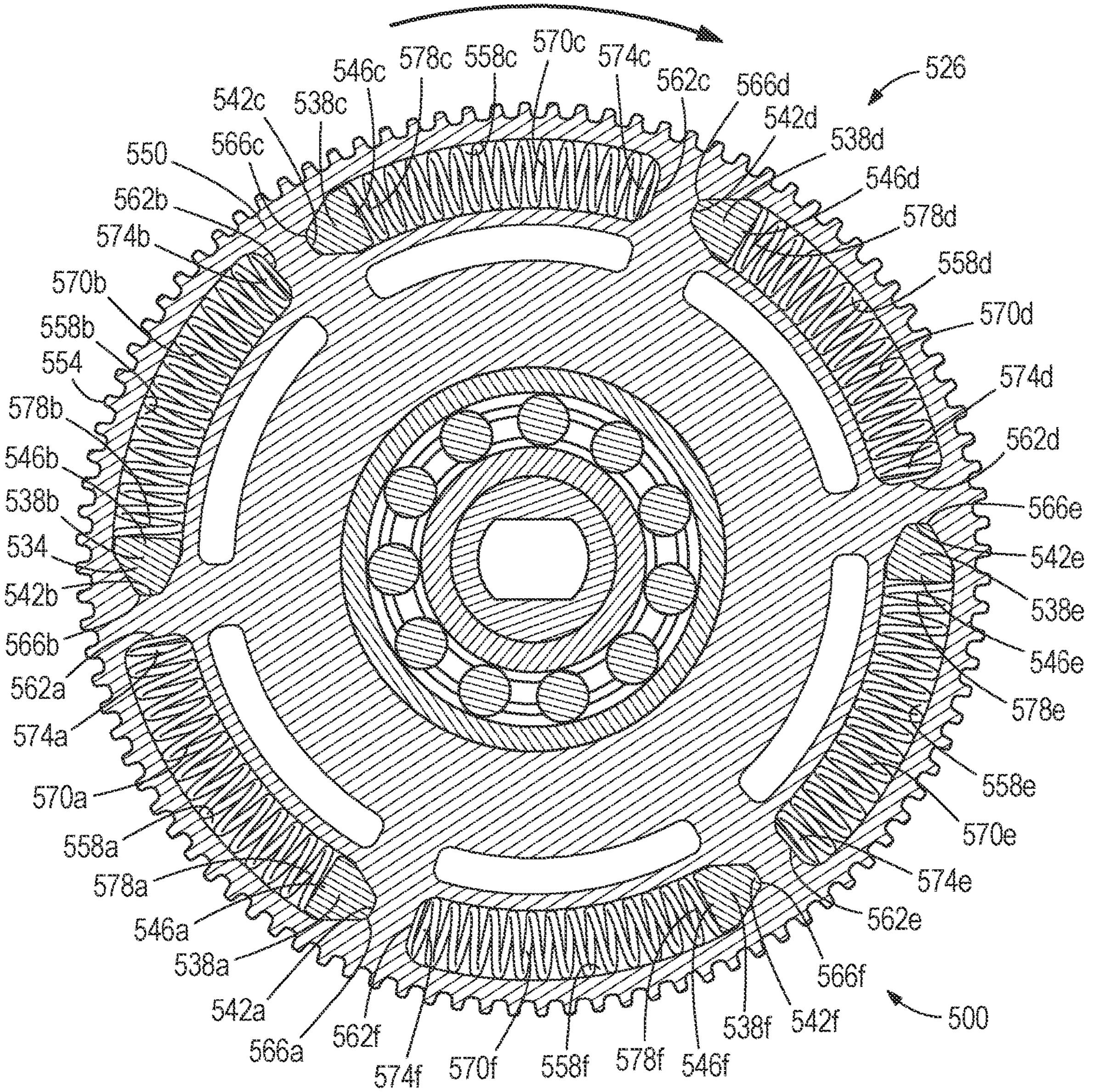
FIG. 6 is a cross-sectional view of the soft-stop transmission of FIG. 4 through section 6-6 in FIG. 4, illustrating the soft-stop transmission in a driven state.

With reference to FIGS. 4-6, another embodiment of a soft-stop transmission 500 may be used in the angle grinder 10 of FIG. 1 or in another power tool (e.g., a band saw, a cut-off saw, a concrete saw, etc.). The power tool may include an accessory that may be, for example, a saw blade. The power tool includes a braking system which may be similar to the braking system discussed previously and that is operable to reduce the speed of the motor along with any downstream permanently driven components of the drivetrain. The motor generates torque and transmits the torque via a belt to a driven pulley 526. An accessory is coupled to the driven pulley 526 and is configured to receive rotational torque from the driven pulley 526. The driven pulley 526 acts as a torque transmission system which rotates in a drive direction, which is clockwise from the perspective of FIG. 6. The drive direction may also be called a rotational direction or a torque-transmitting direction and is shown with the arrow in FIG. 6.

With further reference to FIGS. 4-6, the soft-stop transmission includes a hub 534 to which the accessory is connected for co-rotation. The hub 534 includes a frame 536 and a plurality of fingers 538*a*, 538*b*, 538*c*, 538*d*, 538*e*, 538*f* that extend laterally from the frame 536. Each of the fingers 538*a*, 538*b*, 538*c*, 538*d*, 538*e*, 538*f* includes a respective first side 542*a*, 542*b*, 542*c*, 542*d*, 542*e*, 542*f* and a respective second side 546*a*, 546*b*, 546*c*, 546*d*, 546*e*, 546*f*. The first sides 542*a*, 542*b*, 542*c*, 542*d*, 542*e*, 542*f* of the fingers 538*a*, 538*b*, 538*c*, 538*d*, 538*e*, 538*f* act as torque-receiving surfaces.

With further reference to FIGS. 4-6, the driven pulley 526 also includes a body 550, which has a toothed portion 554 around which the belt is wrapped. A cap 556 is opposite the hub 534 and cooperates with the hub 534 and body 550 to house the internal components of the driven pulley 526. The body 550 may also be called a body portion or a pulley and rotates with a first angular velocity. The body 550 acts as a first torque transmission member. The hub 534 rotates with a second angular velocity and is configured to rotate at least a fraction of a rotation with respect to the body 550. The hub 534 acts as a second torque transmission member. The body 550 includes a plurality of arcuate pockets 558*a*, 558*b*, 558*c*, 558*d*, 558*e*, 558*f*. Each of the pockets 558*a*, 558*b*, 558*c*, 558*d*, 558*e*, 558*f* includes a first interior surface 562*a*, 562*b*, 562*c*, 562*d*, 562*e*, 562*f* and a second interior surface 566*a*. 566*b*, 566*c*, 566*d*, 566*e*, 566*f*. The second interior surfaces 566*a*, 566*b*, 566*c*, 566*d*, 566*e*, 566*f* of the pockets 558*a*, 558*b*, 558*c*, 558*d*, 558*e*, 558*f* act as torque-transmitting surfaces. The fingers 538*a*, 538*b*, 538*c*, 538*d*, 538*e*, 538*f* extend laterally into the pockets 558*a*. 558*b*, 558*c*, 558*d*, 558*e*, 558*f*. The first sides 542*a*, 542*b*, 542*c*, 542*d*, 542*e*, 542*f* of the fingers 538*a*, 538*b*, 538*c*, 538*d*, 538*e*, 538*f* are abutted by and rotationally engaged by the respective second interior surfaces 566*a*, 566*b*, 566*c*, 566*d*, 566*e*, 566*f* of the pockets 558*a*, 558*b*, 558*c*, 558*d*, 558*e*, 558*f*.

The pockets 558*a*, 558*b*, 558*c*, 558*d*, 558*e*, 558*f* have variable sizes depending on the state in which the soft-stop transmission 500 is operating, analogously to how the cavities 94*a*, 94*b* of the embodiment of FIG. 1 have variable sizes. As will be described in further detail below, when the soft-stop transmission 500 is operating in a driven state in which the mated pairs of fingers and second interior surfaces (538*a*, 566*a*: 538*b*, 566*b*: 538*c*, 566*c*; 538*d*, 566*d*: 538*e*, 566*e*: and 538*f*, 566*f*) are engaged, torque is transmitted from the body 550 to the hub 534, causing the hub and any associated accessory to rotate, and the arc length of the pockets 558*a*. 558*b*, 558*c*, 558*d*, 558*e*, 558*f* is maintained at a constant value. However, when the soft-stop transmission 500 is operating in an overrun state, the hub 534 overruns (i.e., rotates relative to) the body 550, causing the fingers 538*a*, 538*b*, 538*c*, 538*d*, 538*e*, 538*f* and the second interior surfaces 566*a*, 566*b*, 566*c*, 566*d*, 566*e*, 566*f* to disengage, and the arc length of the pockets 558*a*, 558*b*, 558*c*, 558*d*, 558*e*, 558*f* is reduced.

With further reference to FIGS. 4-6, the soft-stop transmission 500 also includes one or more damping elements 570*a*, 570*b*, 570*c*, 570*d*, 570*e*, 570*f*, each located within a respective pocket 558*a*, 558*b*, 558*c*, 558*d*, 558*e*, 558*f* formed within the body 550. The damping elements 570*a*, 570*b*, 570*c*, 570*d*, 570*e*, 570*f* may be compression springs or another type of mechanical spring, damper, or combined spring-damper as previously discussed. Each damping element 570*a*, 570*b*, 570*c*, 570*d*, 570*e*, 570*f* includes a respective first end 574*a*, 574*b*, 574*c*, 574*d*, 574*e*, 574*f* and an opposite second end 578*a*, 578*b*, 578*c*, 578*d*, 578*e*, 578*f* and is associated with a respective pocket 558*a*, 558*b*, 558*c*, 558*d*, 558*e*, 558*f* and a respective finger 538*a*, 538*b*, 538*c*, 538*d*, 538*e*, 538*f*. Each of the first ends 574*a*, 574*b*, 574*c*, 574*d*, 574*e*, 574*f* of the damping elements 570*a*, 570*b*, 570*c*, 570*d*, 570*e*, 570*f* contacts the first interior surface 562*a*, 562*b*, 562*c*, 562*d*, 562*e*, 562*f* of that damping element's respective pocket 558*a*, 558*b*, 558*c*, 558*d*, 558*e*, 558*f*. Each of the second ends 578*a*, 578*b*, 578*c*, 578*d*, 578*e*, 578*f* of the damping elements 570*a*, 570*b*, 570*c*, 570*d*, 570*e*, 570*f* contacts the second side 546*a*. 546*b*, 546*c*, 546*d*, 546*e*, 546*f* of its respective finger 538*a*, 538*b*, 538*c*, 538*d*, 538*e*, 538*f*. As such, the damping elements 570*a*, 570*b*, 570*c*, 570*d*, 570*e*, 570*f* bias the body 550 and the hub 534 in opposite rotational directions, with the relative rotational movement between the body 550 and the hub 534 being limited in one direction by each of the fingers 538*a*, 538*b*, 538*c*, 538*d*, 538*e*, 538*f* abutting each of the respective second interior surfaces 566*a*. 566*b*, 566*c*, 566*d*, 566*e*, 566*f* of the respective pockets 558*a*, 558*b*, 558*c*, 558*d*, 558*e*, 558*f*. The relative rotational movement between the body 550 and the hub 534 is limited in an opposite direction by each of the fingers 538*a*, 538*b*, 538*c*, 538*d*, 538*e*, 538*f*, which each abut a respective damping element 570*a*, 570*b*, 570*c*, 570*d*, 570*e*, 570*f*. More specifically, each damping element 570*a*, 570*b*, 570*c*, 570*d*, 570*e*, 570*f* biases the body portion 550 in the rotational direction and biases the hub 534 in a counter-rotational direction. In other words, each damping element 570*a*, 570*b*, 570*c*, 570*d*, 570*e*, 570*f* biases the second side 546*a*, 546*b*, 546*c*, 546*d*, 546*e*, 546*f* of each of the fingers 538*a*, 538*b*, 538*c*, 538*d*, 538*e*, 538*f* away from the first interior surface 562*a*, 562*b*, 562*c*, 562*d*, 562*e*, 562*f* of each of the pockets 558*a*, 558*b*, 558*c*, 558*d*, 558*e*, 558*f*. Each damping element 570*a*, 570*b*, 570*c*, 570*d*, 570*e*, 570*f* is disposed beside one of the fingers 538*a*, 538*b*, 538*c*. 538*d*, 538*e*, 538*f* and on the side of the torque-receiving surface (i.e., on the side of each respective first side 542*a*, 542*b*, 542*c*, 542*d*, 542*e*, 542*f*) that is in the rotational direction. At any point in time, the amount of compression of the damping elements 570*a*, 570*b*, 570*c*, 570*d*, 570*e*, 570*f* depends upon the position of the fingers 538*a*, 538*b*, 538*c*, 538*d*, 538*e*, 538*f* within the pockets 558*a*, 558*b*, 558*c*, 558*d*, 558*e*, 558*f*. In other words, the amount of compression of the damping elements 570*a*, 570*b*, 570*c*, 570*d*, 570*e*, 570*f* depends upon the amount of rotation of the hub 534 with respect to the body 550. In the driven state, each of the damping elements 570*a*, 570*b*, 570*c*, 570*d*, 570*e*, 570*f* bias the first sides 542*a*, 542*b*, 542*c*, 542*d*, 542*e*, 542*f* of the fingers 538*a*, 538*b*, 538*c*, 538*d*, 538*e*, 538*f* into contact with the respective second interior surfaces 566*a*, 566*b*, 566*c*, 566*d*, 566*e*, 566*f* of each of the pockets 558*a*, 558*b*, 558*c*, 558*d*, 558*e*, 558*f*. When the soft-stop transmission 500 transitions from the driven state to the overrun state, the first sides 542*a*, 542*b*, 542*c*, 542*d*, 542*e*, 542*f* of the fingers 538*a*, 538*b*, 538*c*, 538*d*, 538*e*, 538*f* disengage the second interior surfaces 566*a*, 566*b*, 566*c*, 566*d*, 566*e*, 566*f* of the pockets 558*a*, 558*b*, 558*c*, 558*d*, 558*e*, 558*f*, reducing the arc lengths of the pockets 558*a*, 558*b*, 558*c*, 558*d*, 558*e*, 558*f* and thus compressing the damping elements 570*a*, 570*b*, 570*c*, 570*d*, 570*e*, 570*f*. The damping elements 570*a*, 570*b*, 570*c*, 570*d*, 570*e*, 570*f*, when in their rebounded state, also maintain the soft-stop transmission 500 in the driven state with the fingers 538*a*, 538*b*, 538*c*, 538*d*, 538*e*, 538*f* engaged with the second interior surfaces 566*a*, 566*b*, 566*c*, 566*d*, 566*e*, 566*f*.

In operation of the power tool, and with reference to FIG. 6, the motor imparts torque to the driven pulley 526 via the belt. When the motor is deactivated, it may be braked by the braking system as described above to impart a braking torque to the driven pulley 526 in the counter-rotational direction, which may also be called a braking direction. Sudden deceleration, and thus reduction in the angular velocity of the body 550, causes the hub 534 (due to its rotational inertia) to momentarily continue rotating in the same direction (i.e., clockwise from the frame of reference of FIG. 6). In other words, during braking of the body 550, the angular velocity of the hub 534 may not be reduced as quickly as the angular velocity of the body 550. Because the hub 534 and the body 550 are permitted to rotate relative to each other when the braking is initially applied, the first sides 542*a*, 542*b*, 542*c*, 542*d*, 542*e*, 542*f* of the fingers 538*a*, 538*b*, 538*c*, 538*d*, 538*e*, 538*f* momentarily disengage the second interior surfaces 566*a*, 566*b*, 566*c*, 566*d*, 566*e*, 566*f* of the pockets 558*a*, 558*b*, 558*c*, 558*d*, 558*e*, 558*f*, thereby reducing the arc lengths of the pockets 558*a*, 558*b*, 558*c*, 558*d*, 558*e*, 558*f* and compressing the damping elements 570*a*, 570*b*, 570*c*, 570*d*, 570*e*, 570*f*. In other words, for a period of time, the second angular velocity is greater than the first angular velocity. The damping elements 570*a*, 570*b*, 570*c*, 570*d*, 570*e*, 570*f* apply a force to the second sides 546*a*, 546*b*, 546*c*, 546*d*, 546*e*, 546*f* of the fingers 538*a*, 538*b*, 538*c*, 538*d*, 538*e*, 538*f* and to the first interior surfaces 562*a*, 562*b*, 562*c*, 562*d*, 562*e*, 562*f* of the pockets 558*a*, 558*b*, 558*c*, 558*d*, 558*e*, 558*f*, thereby causing the second angular velocity to be reduced gradually. During compression, the damping elements 570*a*, 570*b*, 570*c*, 570*d*, 570*e*, 570*f* apply a moment to the hub 534 in the counter-rotating direction to reduce the difference in angular velocities of the hub 534 and the body 550, eventually bringing the hub 534, an output spindle, and any attached accessory to a stop. The damping elements 570*a*, 570*b*, 570*c*, 570*d*, 570*e*, 570*f* rebound following compression. The compression and rebounding of the damping elements 570*a*, 570*b*, 570*c*, 570*d*, 570*e*, 570*f* permits a "soft stop" of the hub 534. As a result, the torque impulse experienced by the hub 534, the output spindle, and the accessory is reduced, vibrations from the motor are attenuated, and slippage between the belt and the toothed portion 554 of the body 550 is inhibited.

The soft-stop transmission 500 may be used in other power tools or equipment besides the illustrated angle grinder 10.

Although the invention has been described in detail with reference to certain preferred embodiments, variations and modifications exist within the scope and spirit of one or more independent aspects of the invention as described.

Various features of the invention are set forth in the following claims.

What is claimed is:

1. A soft-stop transmission for use in a power tool, the transmission comprising:
- a first component configured to receive torque from a motor of the power tool to rotate the first component in a first rotational direction;
- a second component connectable to an output of the power tool, wherein the second component is configured to rotate in the first rotational direction in unison with the first component, and wherein the second component is configured to rotate in the first rotational direction relative to the first component in response to angular deceleration of the first component; and
- a damping element positioned between the first component and second component, wherein the damping element is configured to bias the first component in the first rotational direction and the second component in an opposite, second rotational direction.

2. The soft-stop transmission of claim 1, wherein the first component includes a torque-transmitting surface and the second component includes a torque-receiving surface, wherein the torque-transmitting surface is configured to contact the torque-receiving surface during normal operation of the power tool in order to transmit torque from the first component to the second component.

3. The soft-stop transmission of claim 2, wherein when the torque-transmitting surface and the torque-receiving surface cease to contact each other, the damping element is compressed.

4. The soft-stop transmission of claim 2, wherein the first component is a ring gear, wherein the second component is a flywheel, and wherein the damping element biases the torque-receiving surface into contact with the torque-transmitting surface.

5. The soft-stop transmission of claim 2, wherein the first component is a pulley, wherein the second component is a hub, and wherein the damping element biases the torque-receiving surface into contact with the torque-transmitting surface.

6. The soft-stop transmission of claim 1, wherein the first component is coupled to a braking system, wherein the rotation of the first component may be selectively slowed by engaging the braking system, and wherein the first component and the second component are configured to rotationally decelerate at different rates when the braking system is engaged.

7. The soft-stop transmission of claim 1, wherein the first component includes at least one torque-transmitting surface, wherein the second component includes at least one torque-receiving surface, and wherein the torque-transmitting surface engages the torque-receiving surface in order to rotate the second component.

8. The soft-stop transmission of claim 1, wherein the first component includes at least one inwardly protruding finger, wherein the second component includes at least one outwardly-protruding ear, and wherein the finger engages the ear in order to rotate the second component.

9. The soft-stop transmission of claim 1, wherein the first component includes a pocket having a torque-transmitting surface, wherein the second component includes a finger having a torque-receiving surface that laterally extends into the pocket, and wherein the torque-transmitting surface engages the torque-receiving surface to rotate the second component.

10. The soft-stop transmission of claim 1, wherein the first component rotates with a first angular velocity and the second component rotates with a second angular velocity, and wherein when the first angular velocity is reduced, the second angular velocity momentarily exceeds the first angular velocity.

11. The soft-stop transmission of claim 10, wherein the damping element applies a force to the second component to reduce the second angular velocity to match the first angular velocity.

12. The soft-stop transmission of claim 10, wherein when the second angular velocity exceeds the first angular velocity, the damping element applies a force to the first torque transmission member and to the second torque transmission member in opposite rotational directions to reduce a difference between the first angular velocity and the second angular velocity.

13. A power tool comprising:
a motor;
a ring gear configured to receive torque from the motor and including a radially extending finger having a first side and an opposite, second side;
a flywheel including a radially extending ear having a first side and an opposite, second side, wherein the flywheel is configured to rotate in a first rotational direction in unison with the ring gear in response to torque received therefrom via engagement between the second side of the finger and the first side of the ear, and wherein the flywheel is configured to rotate in the first rotational direction relative to the ring gear in response to angular deceleration of the ring gear and disengagement of the second side of the finger from the first side of the ear; and
a damping element positioned between the ring gear and the flywheel, wherein the damping element is configured to bias the second side of the finger into engagement with the first side of the ear.

14. The power tool of claim 13, wherein
the ring gear is coupled to a braking system;
the rotation of the ring gear may be selectively slowed by engaging the braking system;
the flywheel is rotatable relative to the ring gear when the braking system is initially engaged; and
rotation of the flywheel relative to the ring gear is reduced by the damping element.

15. The power tool of claim 13, wherein the power tool includes a braking system and wherein, during operation, the damping element is compressed in response to engagement of the braking system.

16. A power tool comprising:
a motor;
a pulley configured to receive torque from the motor and including a pocket having a first interior surface and an opposite, second interior surface;
a hub including a lateral finger having a first side and an opposite, second side, wherein the hub is configured to rotate in a first rotational direction in unison with the pulley in response to torque received therefrom via engagement between the second interior surface of the pocket and the first side of the finger, and wherein the hub is configured to rotate in the first rotational direction relative to the pulley in response to angular deceleration of the pulley and disengagement of the second interior surface of the pocket from the first side of the finger; and
a damping element positioned between the pulley and the hub, wherein the damping element is configured to bias the second interior surface of the pocket into engagement with the first side of the finger.

17. The power tool of claim 16, wherein
the pulley is coupled to a braking system;
the rotation of the pulley may be selectively slowed by engaging the braking system;
the hub is rotatable relative to the pulley when the braking system is initially engaged; and
rotation of the hub relative to the pulley is reduced by the damping element.

18. The power tool of claim 16, wherein the pulley is coupled to a braking system and wherein, during operation, the damping element is compressed in response to engagement of the braking system.

19. The power tool of claim 16, wherein the pulley rotates with a first angular velocity and the hub rotates with a second angular velocity, and wherein when the first angular velocity is reduced, the second angular velocity momentarily exceeds the first angular velocity.

20. The power tool of claim 19, wherein the damping element applies a moment to the hub to reduce the second angular velocity to match the first angular velocity.

21. The power tool of claim 19, wherein when the second angular velocity exceeds the first angular velocity, the damping element applies a moment to the pulley and the hub in opposite rotational directions to reduce a difference between the first angular velocity and the second angular velocity.

* * * * *